Feb. 2, 1943.   L. E. MOBERLY   2,310,108
CARBON BRUSH CONSTRUCTION
Filed Nov. 23, 1940
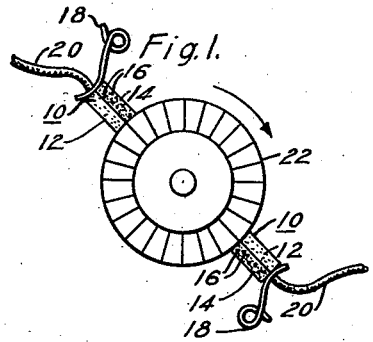
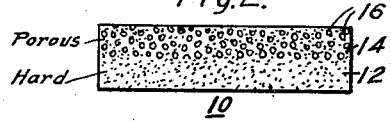
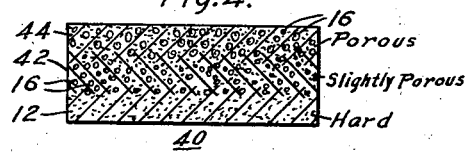
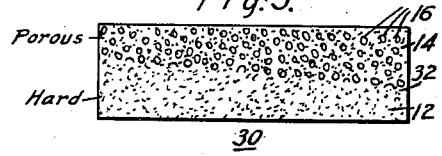
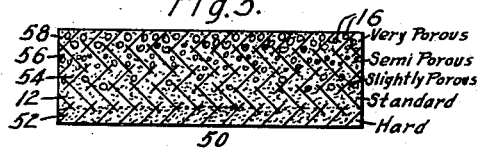
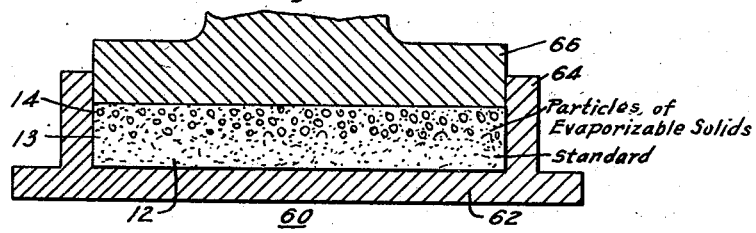
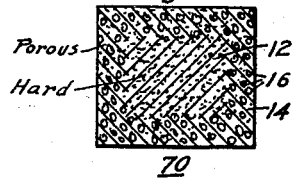
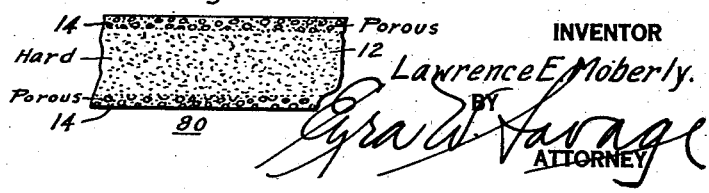
INVENTOR
Lawrence E. Moberly.
BY
ATTORNEY
WITNESSES:

Patented Feb. 2, 1943

2,310,108

UNITED STATES PATENT OFFICE 2,310,108

CARBON BRUSH CONSTRUCTION

Lawrence E. Moberly, Wilkinsburg, Pa., assignor to Westinghouse Electric & Manufacturing Company, East Pittsburgh, Pa., a corporation of Pennsylvania Application November 23, 1940, Serial No. 366,926

7 Claims. (Cl. 171—325)

This invention relates to molded carbon bodies, and more particularly carbon brushes and other members suitable for electrical purposes.

In preparing molded carbon bodies, such as brushes for electrical contacts, by processes known to the prior art, it has been found that the hardness, density, conductivity and wear of the carbon in the brushes could not be varied to any great extent throughout the body of the brush. Attempts have been made in the prior art to modify the properties of carbon brushes by the introduction of foreign elements having different properties, such as metallic wires and the like. The introduction of these foreign members into the carbon brush was attended by many difficulties in the molding and preparation of carbon brushes. In the case of electrographitic brushes, which are subjected to a graphitization treatment at temperatures of up to 5500° F., at which most impurities will volatilize and escape as gases, this expedient is substantially impossible.

For some purposes, it is desirable to prepare carbon bodies, such as electrographitic brushes, having differing properties at different portions of the brush. For certain applications, such as commutator service, brushes whose properties are varied from point to point result in improved performance of the electrical apparatus.

The object of this invention is to provide for a carbon body having different physical properties from portion to portion.

A further object of this invention is to provide for a carbon body having different degrees of porosity.

Another object of this invention is to provide for a carbon brush having toe and heel portions characterized by different wearing characteristics.

Other objects of the invention will be apparent from the following description and drawing when taken in conjunction with the appended claims.

Reference should be had to the accompanying drawing, in which:

Figure 1 is an end view of a pair of brushes of a motor commutator;

Fig. 2 is an elevational view of a carbon brush consisting of two different portions;

Fig. 3 is an elevational view of a carbon brush having two different portions of varying cross-section;

Fig. 4 is an elevational view of the carbon brush consisting of three sections;

Fig. 5 is an elevational view of a brush consisting of five sections;

Fig. 6 is a sectional view of a mold for producing carbon plates;

Fig. 7 is a cross-sectional view of a brush having a harder core than the remainder of the brush; and Fig. 8 is a cross-sectional view of a brush suitable for a reversible motor.

In making carbon bodies, for example, for use as carbon brushes, the raw materials lampblack, coke, charcoal, graphite and similar carbonaceous substances are mixed in selected combinations and proportions. The mixture is combined with a binder such as coal tar, pitches, or resins. Slugs formed from this mixture by compacting under pressure are carbonized or coked by a suitable heat treatment. The carbonized slugs are then pulverized into a finely divided state. After admixing the pulverized slug material with a binder as listed above, and repulverizing to secure good mechanical uniformity, a moldable mixture known as green carbon flour is produced. Green carbon flour of a predetermined fineness is formed into plates under pressures varying from 1000 to 20,000 pounds per square inch. These plates are carbonized by a heat treatment following a carefully controlled temperature cycle to temperatures of about 2200° F. If properly heat-treated, these plates are suitable for use as brushes and resistance plates in the electrical art by cutting to shape.

For some purposes, it is desirable to convert the carbon in the heat-treated plates into the graphitic form. Graphitization of the plates is secured by heating the plates to extremely high temperatures of from 3000° F. to 5500° F. This high temperature treatment will convert as much as 80% of the carbon into the graphitic modification.

In the heat treatment of plates formed from green carbon flour, the binder is partially decomposed into hydrocarbon gases which escape and leave small pores between the particles or grains of the previously carbonized slugs. These pores, which are normally distributed more or less uniformly between the precarbonized grains of carbon throughout carbon brushes and similarly heat-treated carbon bodies, will be referred to herein as intergranular porosities of intergranular pores.

The particular electrical and physical properties, such as porosity, hardness and resistance, are determined by the heat treatment and the method of forming the plates. Since any particular cycle of operations produces plates which do not vary to any great extent in physical and electrical properties between the different portions thereof, it is frequently necessary to employ plates which meet most of the mechanical and electrical requirements of any particular application, even though some other desirable characteristics will be lacking.

Carbon brushes whose properties are not uniform, but are controllably varied throughout the body thereof, present certain desirable characteristics which render them useful for certain purposes. Referring to Fig. 1 of the drawing, there is illustrated a motor commutator and two cooperating carbon brushes 10. The carbon brushes 10 consist of portions or sections 12 and 14 which have considerable differences in their resistance to wear when in contact with the commutator. The portion 12 of the brush 10 consists mainly of fine particles or granules of carbon which have been bonded together by a carbonized binder. The mass of particles or granules in this section contains only very fine intergranular porosity. The portion 14 of the brush consists of similar fine particles or granules of carbon as in section 12. The mass between the particles 14 also exhibits a similar intergranular porosity. In addition, section 14 contains a great number of cavities 16 of a size greater than the intergranular porosity. These cavities are produced by the methods hereinafter described.

The carbon brushes 10 are pressed against the commutator segments 22 by means of springs 18. Conductor leads 20 are connected to the carbon brush 10 by customary means. It will be noted that the direction of rotation of the commutator places section 12 of the brush at the toe, while section 14 is at the heel. Each segment passing underneath a brush 10 first comes into contact with section 12. The further movement of the commutator places the segments in contact with both sections 14 and 12. Due to the difference in the rate of wear of the sections under pressure, the greater portion of the pressure exerted by the springs will be carried through the section 12, and a minor portion through the section 14. Accordingly, the surface pressures between the commutator and section 12 will be higher than those between section 14 and the commutator segment. Accordingly section 14 has a greater contact resistance than section 12. As the commutator rotates out of contact with the brush 10, the final portion of the movement will place section 14 and the commutator in electrical contact. Due to the lower pressures and higher resistance obtainable between section 14, and the commutator, there will be less sparking and heating introduced when the segment 22 separates from the brush than if the brush were to be made entirely of a uniform material. An arrangement such as that shown in Fig. 1 is advantageous, since for a given set of operating conditions the use of a brush construction corresponding to that of brush 10 will reduce the sparking and heating effects common with the prior art commutator and brush arrangements.

Referring to Figs. 2 and 3, there is illustrated two brush structures 10 and 30 in which the portions of different porosity are given different configurations. In both figures the portion 12 is hard and has only intergranular porosities present throughout. The portion 14 is characterized with the additional cavities 16 distributed throughout. As will be noted, the vertical cross-section of the Fig. 2 construction will show substantially equal areas of the porous and less wear resisting material 14 and the harder material 12. In Fig. 3, the dividing line 32 is not parallel to the top and bottom surfaces of the brush, and the area of the materials in sections 14 and 12 varies with succeeding vertical cross-sections going from right to left.

A brush constructed according to the arrangement of Fig. 3 will be useful for applications in cases where the brush is intended to compensate for changes in the commutator. The right-hand end of Fig. 3 would be applied to a freshly dressed or new commutator which would have good electrical contact with the brush 30, and accordingly the portion 14 would conduct a greater proportion of current than it would as the brush wears down. As the commutator surface becomes increasingly poorer, with greater surface contact resistance, the proportion of hard and soft brush material changes, and the increased quantity of the hard material as the brush is worn to the left assists in dressing the commutator to some extent and removing harmful deposits. The relatively smaller resistance of the portion 12 increases the total brush conductivity as wear proceeds.

Where it is desired to vary the brush in small gradations from one portion to the other, the brush may be built up in strata differing slightly from each other in porosity, hardness and other characteristics.

Referring to Fig. 4 of the drawing, the brush 40 illustrates a three-section brush. Brush 40 is composed of the section 12 which consists entirely of carbonaceous particles and only normal intergranular porosities. The section 42 has substantially the same mass structure with a distribution of a slight amount of cavities to give the brush a slightly more porous structure than section 12. The portion 42 will wear much faster than the portion 12 under the same conditions. The outer or uppermost portion 44 of the brush may consist of the same ground mass as section 12, with the provision of a greater number of cavities 16 than occur in the section 42. The brush 40 of Fig. 4 may be used in the same manner as brush 10 of Fig. 1.

Fig. 5 shows a brush construction which may be of value in some instances. The brush 50 is made up of five strata consisting of portions differing from each other in their hardness and resistance to wear. The hard portion 52 of the brush may consist of carbon particles separated only by intergranular porosity. If the brush is not subjected to graphitizing heat treatment, an abrasive material, such as finely divided aluminum oxide and the like, may be added thereto to assist in keeping the commutator clean. The next section 12 is of similar construction to that of section 52, except that the abrasive is lacking. The successive sections 54, 56 and 58 may be made of material corresponding to that in sections 12 and 52, with the exception that the proportion of cavities or porosities 16 in each section is increased to a maximum in section 58.

The porous sections in Figs. 4 and 5 may differ from each other not only in the amount of cavities present in the successive sections, but also in the fineness or size of the pores. Depending on the purpose for which the particular construction is being made, the cavities which are produced may vary from extremely fine apertures not greatly larger than that of the normal intergranular porosity to cavities of the size of one-eighth of an inch or more. It will be appreciated that cavities whose dimensions are large may cause considerable change in the electrical and mechanical properties as they are exposed by the wearing of the brush. Accordingly, finer cavities would be more desirable for this reason.

The cavities shown in the porous sections of the brushes shown in Figs. 2 to 5 may be produced by incorporating into green carbon flour a distribution of fine particles of some solid which will change to a gas at some predetermined temperature. It is preferable to use solids that will change to gases at some temperature below 500° C. for ease in preparing the brush. However, the temperature at which the solids change to gases is not critical as long as it is below the maximum heat-treating temperature. Examples of solids suitable for the purpose of incorporation into the green carbon flour are oxalic acid, ammonium carbonate, depolymerizable resins, such as polystyrene, and solids which evaporate at low temperatures, for example, ferric chloride. Particles of any of these materials when ground to some predetermined size may be mixed with the green carbon flour to secure a uniform dispersion. A binder, such as tar, pitches or resins, is added to produce a moldable composition.

In preparing the brush construction such as disclosed in Fig. 2, reference should be had to the molding apparatus of Fig. 6. The molding apparatus comprises a pressure molding apparatus 60 composed of a mold 62 and a ram 66. The mold 62 has vertical sides 64 conforming to the size of plate desired. Into this mold is placed a layer 12 of predetermined thickness of the standard green flour without any admixture therein. In some cases, a template guided and running along the top of walls 64 may be employed to smooth down the layer of standard green carbon material 12. Thereafter, a second layer of the green carbon flour containing the particles of the evaporizable solid 13 is introduced into the mold 62. The ram 66 is then operated to compact the material within the mold under a pressure of from 1000 to 20,000 pounds per square inch, according to desired results. The compacted plates are removed from the mold and placed within a heat-treating furnace capable of producing a temperature sufficient to cause the particles of solid 13 in layer 14 to evaporate and to escape. Thereafter, the carbon plate is subjected to the usual cycle of heat treatment running up to 2200° F. to produce the required carbon plate. It is equally feasible to cause evaporation of the solids as a part of the heat-treatment cycle. The plate may be subjected to an additional graphitization heat treatment if conversion of some portion of the carbon to graphite is desired.

The cavities 16 produced by the escape of solids 13 persist and remain an integral part of the structure of the section 14 of the brush. It has been found that the bond between sections 12 and 14 is such that the carbon block is substantially unitary, except for the difference in structure. Accordingly, delamination of the brush will not occur except under stresses which will cause failure of the entire structure.

The plate produced by such an operation may be cut by means of carborundum saws into any size or shape of brush or other desired member.

It is not necessary that the same type of green carbon flour be used for producing sections 12 and 14. It will be feasible to employ a different type or a different sized grain green carbon flour for the two sections. Variations in properties between the sections thus may be secured which, in combination with the difference in porosity, will yield a wide range of possible combinations.

Referring to Fig. 7 of the drawing, there is illustrated a brush construction embodying a central core of the dense carbon structure with only intergranular porosity present. The exterior of the member 70 consists of the porous type of carbon produced as hereinabove disclosed. The hard core in the Fig. 7 construction may be produced by placing a layer of carbon flour including the evaporizable solids and binder, in a mold about a central insert corresponding to the shape of section 12. A slight tamping will cause the porous material to consolidate. The insert may be then removed and the green carbon flour without any admixture deposited therein. The entire structure may then be consolidated in the usual manner by pressure and heat treatment. The brush 70 is useful for a reversible motor. Regardless of the direction of rotation the porous portion reduces sparking as in Fig. 1.

Referring to Fig. 8, a brush construction 80 suitable for a reversible motor is shown. The hard center 12 of the brush, consisting only of fine carbon particles and intergranular interstices, thus having good conductivity is faced on top and bottom with more resistant, porous strata 14. The brush 80 may be used in the manner shown in Fig. 1 in a reversible motor.

The several constructions disclosed in the preceding figures are merely illustrative of the many types of combinations obtained, and are not limiting. Any desired number of strata differing from each other in the decrease of porosity may be put together. The various materials need not be assembled with geometrical exactness, but a certain amount of irregularity is tolerable and not necessarily harmful.

Furthermore, it is to be understood that the particular form of product shown and described and the particular procedure set forth are presented for the purposes of explanation and illustration, and that various modifications of said product and procedure can be made without departing from the scope of the appended claims.

I claim as my invention:

1. A carbon body comprising, in combination, a unitary mass composed mainly of carbon particles bonded together by means of a carbonized binder, the carbon body composed of one portion having a substantially uniform density and porosity and a second portion characterized by a distribution of cavities of larger size than the porosity in addition to the pores normally present between bonded particles, the cavities resulting from a distribution within the second portion of particles of a solid substance capable of volatilizing under heat treatment, the body being heat-treated to cause the solid substance to volatilize and escape, leaving cavities in the second portion.

2. A carbon body comprising, in combination, a porous unitary mass composed mainly of carbon granules bonded by a carbonized binder to produce substantially the same intergranular porosity throughout the body, one portion of the mass characterized by a distribution of cavities larger than the intergranular pores in order to provide for a different degree of wear and density between portions of the carbon body, the portion with the cavities having a higher electrical resistance and wearing more rapidly than the portion without such cavities.

3. An electrical contact element characterized by different rates of wear during operation between different portions comprising a porous unitary block composed mainly of finely divided granules of carbon held together by a carbonized binder and having substantially the same intergranular porosity throughout the block, one portion of the block having an additional distribution of cavities other than the intergranular pores, the additional cavities resulting from an incorporation of particles of solids gasifiable at predetermined temperatures and a heat treatment of the block above said predetermined temperatures to gasify and drive off the particles, thereby to produce cavities conforming to the particles, the portion with the cavities having a higher electrical resistance and wearing more rapidly than the portion without such cavities.

4. An electrical contact element characterized by different rates of wear during operation between different portions comprising a porous unitary block composed mainly of finely divided granules of carbon held together by a carbonized binder and having substantially the same intergranular porosity throughout the block, one portion of the block having an additional distribution of cavities other than the intergranular pores, the additional cavities resulting from an incorporation of particles of solids gasifiable at predetermined temperatures and a heat treatment of the block above said predetermined temperatures to gasify and drive off the particles, thereby to produce cavities conforming to the particles, and the portion with the additional cavities being equal to the portion without the cavities.

5. An electrical contact element characterized by different rates of wear during operation between different portions comprising a porous unitary block composed mainly of finely divided granules of carbon held together by a carbonized binder and having substantially the same intergranular porosity throughout the block, one portion of the block having an additional distribution of cavities other than the intergranular pores, the additional cavities resulting from an incorporation of particles of solids gasifiable at predetermined temperatures and a heat treatment of the block above said predetermined temperatures to gasify and drive off the particles, thereby to produce cavities conforming to the particles, and the portion with the additional cavities being substantially geometrically similar to the portion without the cavities.

6. An electrical contact member characterized by different resistance to wear between different portions thereof, comprising a unitary porous block composed mainly of carbonaceous granules bonded together by a carbonized binder and having substantially the same intergranular porosity throughout the block, the block consisting of a plurality of strata, at least two of the strata having additional cavities other than the intergranular pores present therein to modify their resistance to wear.

7. A unitary carbon brush comprising, in combination, a core of fine carbon granules bonded together by a carbonized binder and having only intergranular porosity and an external layer of fine carbon granules bonded with a carbonized binder and having an intergranular porosity similar to that of the core and additional cavities of larger size distributed throughout the external layer.

LAWRENCE E. MOBERLY.